United States Patent
Hu et al.

(10) Patent No.: US 9,740,353 B2
(45) Date of Patent: Aug. 22, 2017

(54) SYSTEM AND METHOD FOR 3D POSITION AND GESTURE SENSING OF HUMAN HAND

(71) Applicant: The Trustees of Princeton University, Princeton, NJ (US)

(72) Inventors: Yingzhe Hu, Princeton, NJ (US); Liechao Huang, Princeton, NJ (US); Naveen Verma, Princeton, NJ (US); Sigurd Wagner, Princeton, NJ (US); James C. Sturm, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 14/932,581

(22) Filed: Nov. 4, 2015

(65) Prior Publication Data
US 2017/0123528 A1 May 4, 2017

Related U.S. Application Data

(63) Continuation-in-part of application No. 14/888,832, filed as application No. PCT/US2014/437163 on Nov. 3, 2015.
(Continued)

(51) Int. Cl.
*G06F 3/044* (2006.01)
*G06F 3/01* (2006.01)

(52) U.S. Cl.
CPC .............. *G06F 3/044* (2013.01); *G06F 3/017* (2013.01); *G06F 2203/04101* (2013.01); *G06F 2203/04104* (2013.01)

(58) Field of Classification Search
CPC ...... G06F 3/0416; G06F 3/017; G06F 3/0346; G06F 3/0412; G06F 3/044;
(Continued)

(56) References Cited

U.S. PATENT DOCUMENTS 6,400,359 B1   6/2002  Katabami
2011/0279364 A1*  11/2011  Koshiyama ........... G06F 3/0412
                                                        345/156
(Continued)

FOREIGN PATENT DOCUMENTS

JP          60074014 A     4/1985
JP         2008117371 A    5/2008
(Continued)

OTHER PUBLICATIONS

Kim et al., "A Mobile-Display-Driver IC Embedding a Capacitive Touch-Screen Controller System" International Solid-State Circuits Conference, Feb. 8, 2010.
(Continued)

*Primary Examiner* — Lisa Landis
(74) *Attorney, Agent, or Firm* — Meagher Emanuel Laks Goldberg & Liao, LLP

(57) ABSTRACT

A three dimensional touch sensing system having a touch surface configured to detect a touch input located above the touch surface is disclosed. The system includes a plurality of capacitive touch sensing electrodes disposed on the touch surface, each electrode having a baseline capacitance and a touch capacitance based on the touch input. An oscillating plane is disposed below the touch surface. A touch detector is configured to drive one of the touch sensing electrodes with an AC signal having a frequency that shifts from a baseline frequency to a touch frequency based on the change in electrode capacitance from the baseline capacitance to the touch capacitance. The touch detector is configured to drive the oscillating plane to the touch frequency.

25 Claims, 16 Drawing Sheets

Related U.S. Application Data

(60) Provisional application No. 62/076,205, filed on Jun. 11, 2014, provisional application No. 61/892,516, filed on Oct. 18, 2012, provisional application No. 61/820,242, filed on May 7, 2013.

(58) Field of Classification Search
CPC . G06F 2203/04101; G06F 2203/04104; G06F 2203/04107; G06F 2203/04108; G06F 2203/04112; G06K 9/00201; G06K 9/00355; G06K 9/00375
See application file for complete search history.

(56) References Cited

U.S. PATENT DOCUMENTS

| | | | |
|---|---|---|---|
| 2012/0092296 A1* | 4/2012 | Yanase | G06F 3/0416 345/174 |
| 2013/0057501 A1* | 3/2013 | Nagata | G06F 3/016 345/173 |
| 2013/0154973 A1* | 6/2013 | Tung | G06F 3/016 345/173 |

FOREIGN PATENT DOCUMENTS

| | | |
|---|---|---|
| JP | 2013501291 A | 1/2013 |
| WO | 2006106714 A1 | 10/2006 |

OTHER PUBLICATIONS

Nicholson "ACMI Air Core Mutual Inductance Calculator" v0.8b (http://abelian.org/acmi/).

Hajimiri et al., "Design Issues in CMOS Differential LC Oscillators", IEEE J. Solid State Circuits, vol. 34, No. 5, pp. 717-724, May 1999.

Someya et al. "Organic Semiconductor Devices with Enhanced Field and Environmental Responses for Novel Applications", MRS Bulletin, vol. 33, pp. 690-696, Jul. 2008.

Ishida et al. "Insole Pedometer with Piezoelectric Energy Harvester and 2V Organic Digital and Analog Circuits", IEEE, International Solid-State Circuits Conference, Feb. 22, 2012.

Huang et al. "Integrated All-silicon Thin-film Power Electronics on Flexible Sheets for Ubiquitous Wireless Charging Stations based on Solar-energy Harvesting", IEEE VLSI Symp. Circuits, Jun. 2012 (in press).

Miura et al. "Analysis and design of inductive coupling and transceiver circuit for inductive inter-chip wireless superconnect" IEEE Journal of Solid-State Circuits, vol. 40, No. 4, pp. 829-837, Apr. 2005.

European Search Report for 14795467.1 dated Nov. 22, 2016.

Zack Albus: "PCB-Based Capacitive Touch Sensing With MSP430", Texas Instruments Application Report, No. SLAA363A, pp. 1-25, Oct. 2007.

* cited by examiner

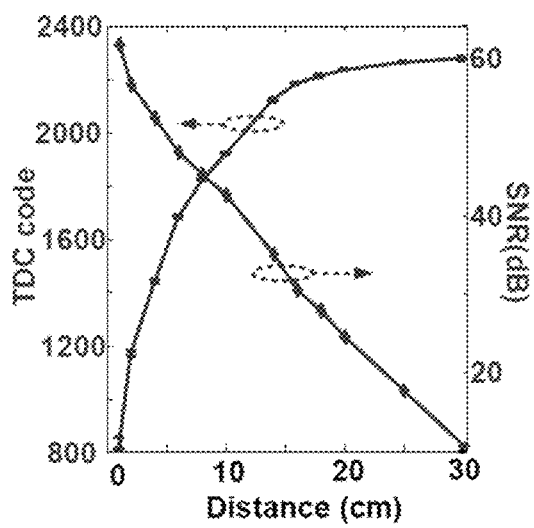 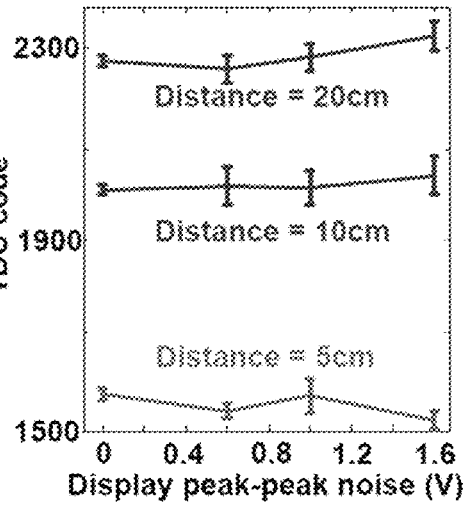
Figure 5a Figure 5b
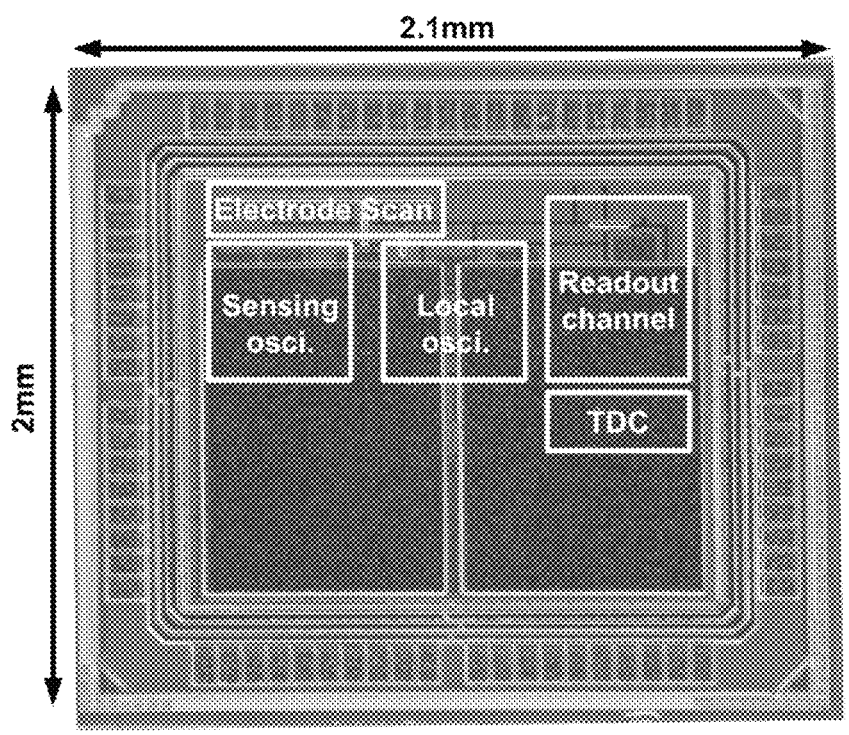
Figure 7

|  | H.-R. Kim ISSCC10 | K.-D. Kim ISSCC12 | J.-H. Yang ISSCC13 | This work |
|---|---|---|---|---|
| Process | 1.5/5.5/30V 90nm CMOS | 1.5/5.5/30V 90nm LDI | 3.3V 350nm CMOS | 1.2/2.5V 130nm CMOS |
| Channels | 24 (X+Y) | 30 (X+Y) | Tx 27; Rx 43 | 8 (X+Y) |
| Panel size | 6.5cm x 4.9cm | 6.5cm x 4.9cm | 20.5cm x 15.4cm | 40cm x 40cm |
| 3D sensing | X | X | X | To 30cm |
| Capacitance type | Self capacitance | Self capacitance | Mutual capacitance | Self capacitance |
| Scan frequency | 120Hz | 120Hz | 120Hz | 240Hz |
| SNR | 30dB | 35dB | 39dB | 50dB@5cm 30dB@15cm 20dB@23cm |
| Resolution | -- | 0.9mm† | -- | 7.1mm(x) 7.1mm(y) 10mm(z)@20cm(hand) |
| Power consumption | 12mW | 10.6mW | 16.7mW | 475µW (readout) 19mW (OP) |

†Precise definition of resolution not available

Figure 6

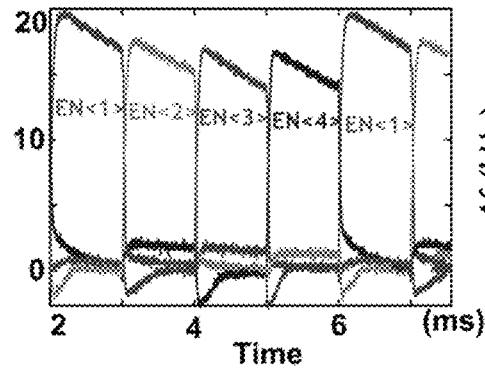
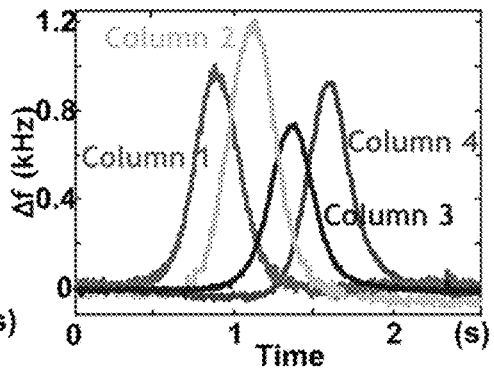
Figure 16a          Figure 16b
| Performance Summary (copper electrodes) | | | |
|---|---|---|---|
| Technology | | | |
| LAE | a-Si on 50μm polyimide @ 180 °C | | |
| CMOS IC | 130nm CMOS | | |
| LAE Sensing Array | | | |
| Channels | 4 x 4 | Panel size | 40cm x 40cm |
| Freq. | 1.2~3MHz | SO power | 24mW@20V |
| CMOS IC Readout | | | |
| SNR | 35dB@4cm 22dB@10cm | Resolution* @10cm | 1.8cm(x) 1.8cm(y) 1cm(z) |
| Scan rate | 240Hz | Power consumption | 1.8mW |
*Resolution is defined as displacement where mean TDC code equals code RMS.
Figure 17

SYSTEM AND METHOD FOR 3D POSITION AND GESTURE SENSING OF HUMAN HAND

CROSS-REFERENCE TO PRIOR FILED APPLICATIONS

This application is a continuation-in-part of Ser. No. 14/888,832 filed on Nov. 3, 2015 which is incorporated herein its entirety. This application claims priority to U.S. provisional application 62/076,205 which was filed on Nov. 6, 2014, which is related to U.S. provisional application 61/892,516 which was filed on Oct. 18, 2012 and U.S. provisional application 61/820,242 which was filed on May 7, 2013, which are all incorporated herein in their entirety as well as PCT patent application No. PCT/US14/37163, filed on May 7, 2014 and U.S. application Ser. No. 14/888,832 filed on Nov. 3, 2015 both of which are incorporated herein their entirety.

GOVERNMENT RIGHTS IN THIS INVENTION

This invention was made with government support under Grant No. ECCS-1202168 and No. CCF-1218206 awarded by the National Science Foundation. The government has certain rights in the invention.

TECHNICAL FIELD

This invention relates generally to systems and methods for touch sensing and in more particular three-dimensional touch sensing.

BACKGROUND

Capacitive touch screens have enabled compelling interfaces for displays. Three-dimensional (3D) sensing, where user gestures can also be sensed in the out-of-plane dimension to distances of about 20-30 cm, represents new interfacing possibilities that could substantially enrich user experience, especially with large displays. The challenge is achieving sensitivity at these distances when sensing the small capacitive perturbations caused by user interaction with sensing electrodes. Among capacitive-sensing approaches, self-capacitance enables substantially greater distance than mutual capacitance (i.e., between electrodes), but can suffer from ghost effects during multi touch. Sensing distance of such systems has still been too limited for 3D sensing. Improved techniques are needed to enable 3D sensing, particularly where gestures can be sensed in the out-of-plane dimension to distances of about 20-30 cm.

SUMMARY OF THE INVENTION

A three dimensional touch sensing system having a touch surface configured to detect a touch input located above the touch surface is disclosed. The system includes a plurality of capacitive touch sensing electrodes disposed on the touch surface, each electrode having a baseline capacitance and a touch capacitance based on the touch input. An oscillating plane is disposed below the touch surface. A touch detector is configured to drive one of the touch sensing electrodes with an AC signal having a frequency that shifts from a baseline frequency to a touch frequency based on the change in electrode capacitance from the baseline capacitance to the touch capacitance. The touch detector is configured to drive the oscillating plane to the touch frequency.

The touch surface may be a display having a common electrode located below the oscillating plane. The touch surface may be a display having a combined common electrode and oscillating plane. The plurality of capacitive touch sensing electrodes may include a plurality of row electrodes and a plurality of column electrodes. The plurality of capacitive touch sensing electrodes may be configured in a two-dimensional array. The oscillating plane may be configured as a rectangular area. The oscillating plane may be configured with a plurality of independently drivable segments.

The touch detector may be configured to determine a distance Z from the touch surface to the touch input based on the change in electrode capacitance from the baseline capacitance to the touch capacitance. The plurality of capacitive touch sensing electrodes may have an X-Y geometric relationship with respect to the touch surface and the touch detector may be configured to determine an X-Y location of the touch input based on the X-Y geometric configuration of the plurality of capacitive touch sensing electrodes with respect to the touch surface. The system may be configured with a frequency-readout integrated circuit (IC), the touch surface being configured with capacitance-to-frequency conversion circuitry and the frequency-readout IC being configured with frequency to digital conversion circuitry. An inductive loop may be coupled to the capacitance-to-frequency conversion circuitry, the frequency-readout IC being inductively coupled to the inductive loop.

A three dimensional touch sensing method for use with a touch surface configured to detect a touch input located above the touch surface is also disclosed. The method includes providing a plurality of capacitive touch sensing electrodes disposed on the touch surface, each electrode having a baseline capacitance and a touch capacitance based on the touch input. An oscillating plane is provided below the touch surface. One of the touch sensing electrodes is driven with an AC signal having a frequency that shifts from a baseline frequency to a touch frequency based on the change in electrode capacitance from the baseline capacitance to the touch capacitance. The oscillating plane is driven to the touch frequency.

The touch surface may be a display having a common electrode located below the oscillating plane. The touch surface may be a display having a combined common electrode and oscillating plane. The plurality of capacitive touch sensing electrodes may include a plurality of row electrodes and a plurality of column electrodes. The plurality of capacitive touch sensing electrodes may be configured in a two-dimensional array. The oscillating plane may be configured as a rectangular area. The oscillating plane may be configured with a plurality of independently drivable segments.

A distance Z from the touch surface to the touch input may be determined based on the change in electrode capacitance from the baseline capacitance to the touch capacitance. The plurality of capacitive touch sensing electrodes may have an X-Y geometric relationship with respect to the touch surface. An X-Y location of the touch input may be determined based on the X-Y geometric configuration of the plurality of capacitive touch sensing electrodes with respect to the touch surface. A frequency-readout integrated circuit (IC) may be provided. The touch surface may be configured with capacitance-to-frequency conversion circuitry and the frequency-readout IC may be configured with frequency to digital conversion circuitry. An inductive loop may be coupled to the capacitance-to-frequency conversion circuitry, the frequency-readout IC being inductively coupled to the inductive loop.

BRIEF DESCRIPTION OF THE FIGURES

FIG. 5a is a graph showing readout SNR and TDC code (with RMS bars) plotted versus distance for a finger positioned above a sensing electrode;

FIG. 5b is a graph showing the TDC code (with RMS bars) when display noise, varied from zero to various peak-peak values, is driven directly onto the OP;

FIG. 6 is a table showing a measurement summary and a comparison with the state of the art;

FIG. 7 is a diagram of a prototype frequency-readout IC;

FIG. 16a is a graph showing the round-robin EN<1-4> signals generated by the TFT scan circuits;

FIG. 16b is a graph showing the frequency shift obtained from the CMOS readout IC while swiping a hand across a row of electrodes at a distance of 6 cm; and FIG. 17 is a table showing a performance summary of the prototype touch sensing system;

DETAILED DESCRIPTION

Disclosed herein are enhanced 3D touch sensing systems. In one embodiment the system has a 40×40 cm² sensing area and sensing distance to about 30 cm. This distance is achieved by incorporating several techniques. For example, capacitance sensing may be performed through frequency modulation, and the sensitivity of frequency readout enhanced by high-Q oscillators capable of filtering noise sources in the readout system as well as stray noise sources from display coupling. The capacitance signal may be enhanced by eliminating electrostatic coupling between the sensing electrodes and surrounding ground planes or grounded features.

Figure 1A:
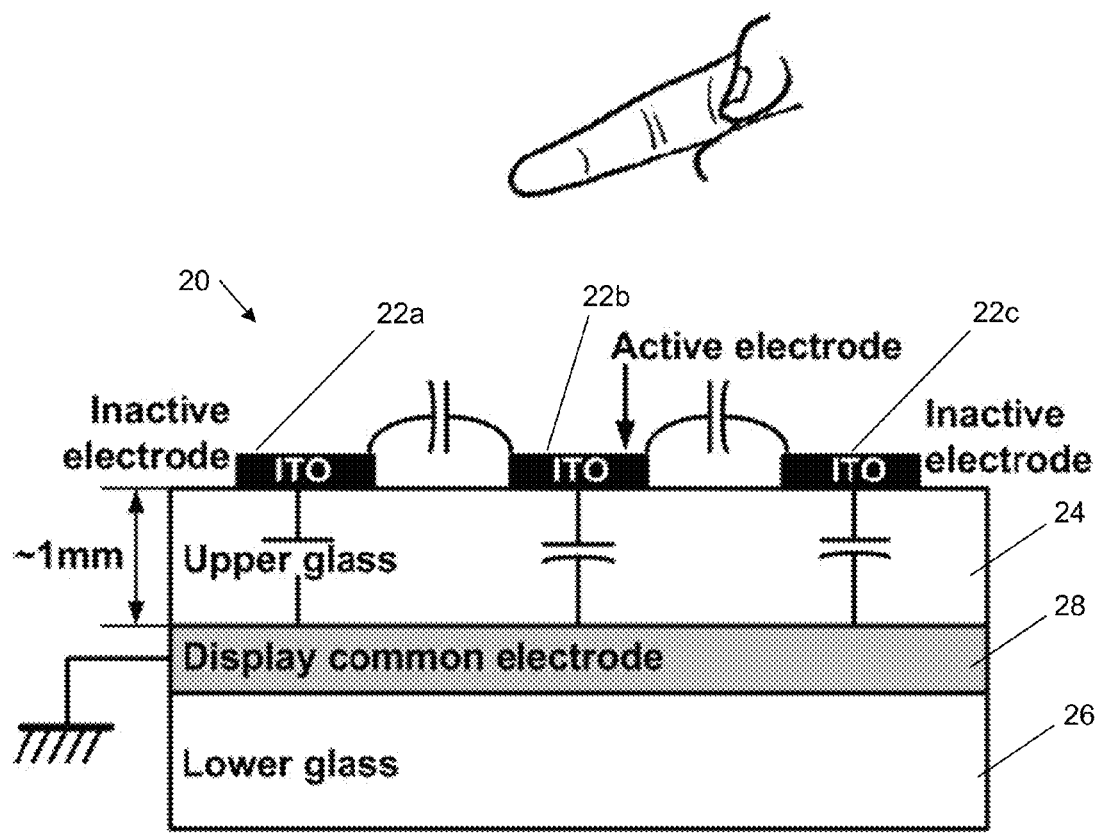
FIG. 1a is a bock diagram of display including touch sensors and a common electrode.

FIG. 1a is a bock diagram of display 20 including touch sensing electrodes 22a-22c. The display 20 includes an upper dielectric (e.g., glass) 24, lower dielectric (e.g., glass) 26 and a common-electrode 28. In this example, the touch sensing electrodes 22a-22c are formed of Indium Tin Oxide (ITO). It should be understood other materials may be used without departing from the scope of this disclosure. It should also be understood that any number of touch sensing electrodes may be provided. It should also be understood that the touch sensing electrodes may be formed in a variety of shapes as discussed in more detail below. In order to minimize the thickness of a typical display, the touch sensing electrodes 22a-22c are integrated with increasingly-minimal separation to the plane of the common-electrode 28. This causes large electrostatic coupling (fringing) from the sensing electrodes to the display (both directly and through adjacent electrodes), substantially degrading the coupling achievable to a user at a distance.

Figure 1B:
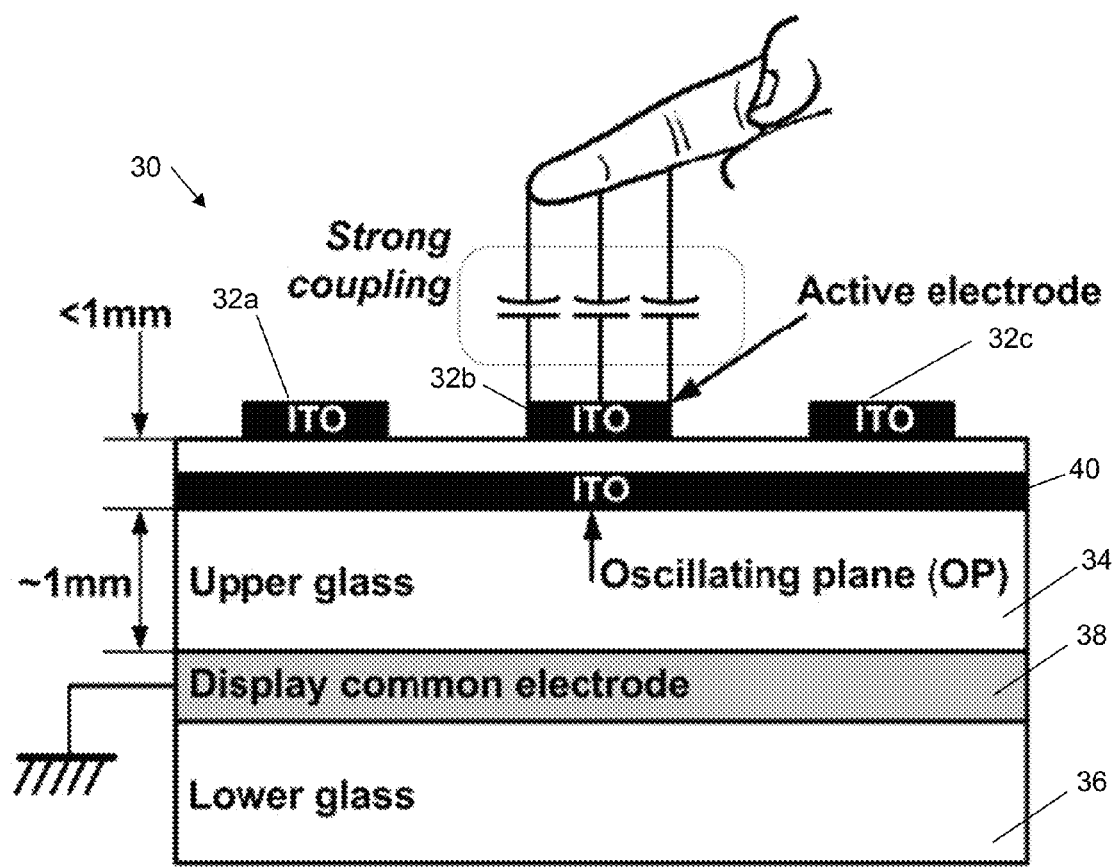
FIG. 1b is a bock diagram of display including touch sensing electrodes that are isolated from the plane of the common electrode.

FIG. 1b is a bock diagram of display 30 including touch sensing electrodes 32a-32c. The display 30 includes an upper glass 34, lower glass 36 and a common-electrode 38 similar to FIG. 1a. Again in this example, the touch sensing electrodes 22a-22c are formed of ITO. It should again be understood other materials may be used without departing from the scope of this disclosure. As discussed in connection with FIG. 1a, it should also be understood that any number of touch sensing electrodes may be provided and the touch sensing electrodes may be formed in a variety of shapes. In this example, the touch sensing electrodes 32a-32c are isolated from the plane of the common electrode 38 by an oscillating plane (OP) 40. In general, the coupling between the touch sensing electrodes 32a-32c and the OP 40 mitigates electric field fringing to the display's ground plane beneath.

Figure 1C:
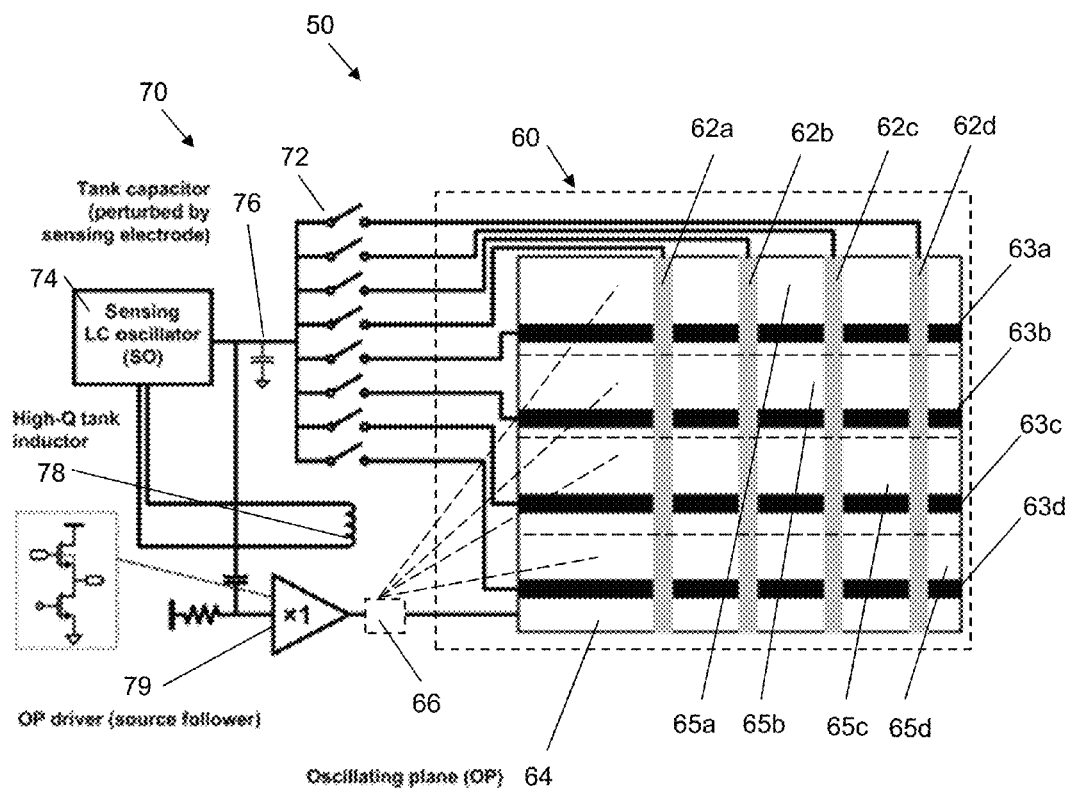
FIG. 1c is a block diagram of a touch sensing system 50 that can be integrated with a display or other touch surface.

FIG. 1c is a block diagram of a touch sensing system 50 that can be integrated with a display or other touch surface 60 shown generally in dashed lines. As shown, touch sensing electrodes 62a-62d, 63a-63d are formed on the touch surface as bars in a row/column format and are connected one-by-one to a detector shown generally by reference number 70. It should be understood that a variety of detectors may be used without departing from the scope of this disclosure. In general the detector 70 determines a frequency shift based on a change in capacitance at one of more touch sensing electrode. In absence of a touch from a user, each touch sensitive electrode has a baseline self-capacitance. As a user, e.g., a user's finger, approaches the touch surface, one or more touch sensitive electrodes begins to couple to the finger and there is a change in the baseline capacitance of the electrode to a touch capacitance. The resulting change in capacitance/frequency shift can then be correlated to a distance Z. The configuration of the electrodes may then be used to identify an X-Y location or area on the touch surface to provide 3D touch detection.

In this example, the detector 70 includes an LC sensing oscillator (SO) 74 that is coupled to the touch sensitive electrodes 62a-62d, 63a-63d via switch 72. The SO generally includes a tank capacitance 76 and tank inductor 78. Depending on the proximity of a user, the self-capacitance of each touch sensitive electrode perturbs the tank capacitance 76, causing a frequency shift. Meanwhile, the OP 64 is driven to the same voltage as the SO 74 (and hence the connected electrode) by a unity-gain buffer 79 implemented by a source follower. Consequently, electric field due to oscillatory charge redistribution on the electrode does not interact with the OP, resulting in much stronger coupling to a user even at great distances. In addition to sensing distance, this enables several benefits. First, since coupling between the electrodes and the OP is not a factor, their separation distance can be aggressively reduced (<1 mm is used in this work). Second, separation between the OP and the display common electrode can also be reduced at the cost of increased OP capacitance and thus higher power in the unity-gain buffer; however, the OP driver consumes less than 19 mW in this example with a separation of 1 mm, making its overhead acceptable. A benefit of frequency-modulated readout is also that minimal noise is imposed on the display since the amplitude is not critical for increasing distance and is thus fixed at a value (0.75V). Third, extended sensing distance enables electrodes to provide later-displacement information (characterized below), allowing fewer electrode channels for covering large display areas, thus reducing power consumption and scan-rate constraints.

In some cases, the use of multiple figures can create difficulty in resolving an accurate touch position. It should be understood that the OP 64 may be implemented as a single plane or may subdivided. For example, FIG. 1c shows an optional configuration where the OP 64 is divided into a plurality of segments, e.g., four column-wise segments 65a-65d as shown my dashed lines. Each OP segment 65a-65d may be coupled to a switch shown generally by reference number 66 and energized individually during touch sensing. This allows for more accurate identification of the touch location particularly when using a row/column configuration for touch sensors.

Figure 2A:
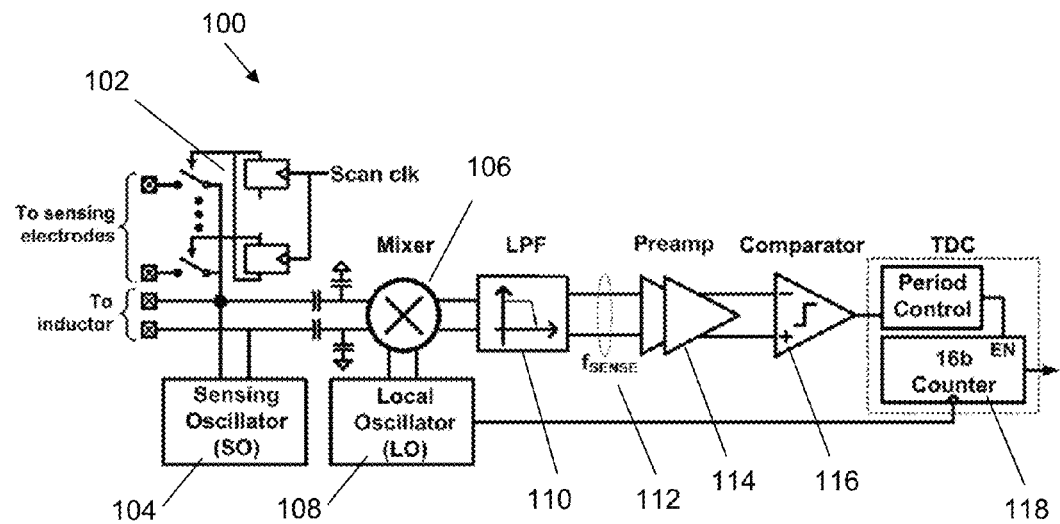
FIG. 2a is a block diagram of a readout channel.
Figure 2B:
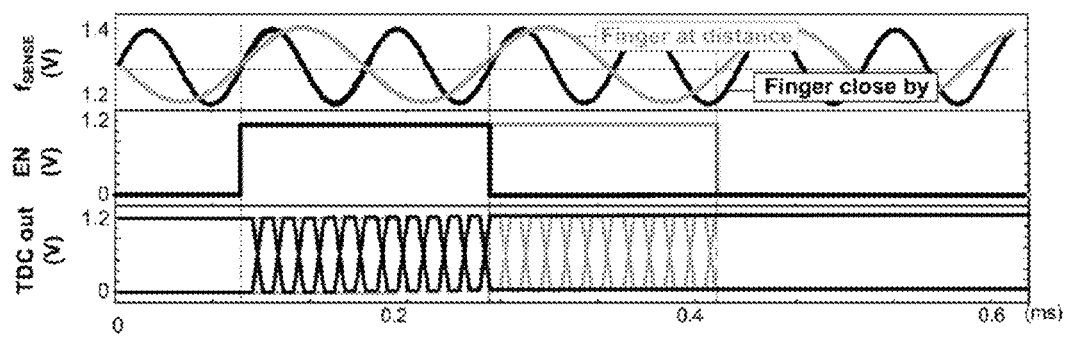
FIG. 2b is a graph showing simulation waveforms that illustrate the frequency-modulation response of the readout channel 100 for a finger close by and at distance.

FIG. 2a is a block diagram of a readout channel 100. FIG. 2b is a graph showing simulation waveforms that illustrate the frequency-modulation response of the readout channel 100 for a finger close by and at distance. In this example, scanning of the touch sensing electrodes is controlled by a shift register 102. The SO's 104 nominal center frequency, e.g., $f_C$=5 MHz, e.g., tunable via varactor, is perturbed by an amount $\Delta f$ due to the sensed capacitance. The SO 104 output is hen fed to a mixer 106, e.g., differential Gilbert mixer, and modulated down using a fixed local oscillator (LO) 108. A low-frequency output $f_{SENSE}$ 112 is then derived from a low-pass 110, e.g., a 2nd-order filter. The nominal SO and LO frequencies are offset by $f_{OFFSET}$, e.g., tunable by varactor, to give a minimum $f_{SENSE}$, which sets both the maximum output range of the time-to-digital converter (TDC) 118 as well as the maximum scan rate. In this example $f_{OFFSET}$ can be set from 5 kHz to 20 kHz. $f_{SENSE}$ is amplified via a preamp 114, e.g., 2-stage preamp and a comparator 116 before being provided to the TDC 118. The resulting digital signal controls an enable signal EN for a 16b counter through a period-control block. Since $f_{SENSE}$ is a fairly non-linear function over sensing distance, the period-control block helps address TDC dynamic range by allowing multiples of the $f_{SENSE}$ period to be selected for the counter EN signal; when $f_{SENSE}$ is at high frequencies (due to short sensing distances), multiples N=2,4,8,16 can be selected. Such cases can be determined from the TDC code, and a digital controller can readily respond since higher $f_{SENSE}$ frequencies correspond to reduced readout delay. The sensed frequency shift, for a TDC count C, is thus given by $\Delta f = N \times f_C/C - f_{OFFSET}$. Readout noise is a key factor for determining sensitivity and is dominated by the SO/LO, mixer, and preamp.

Figure 3A:
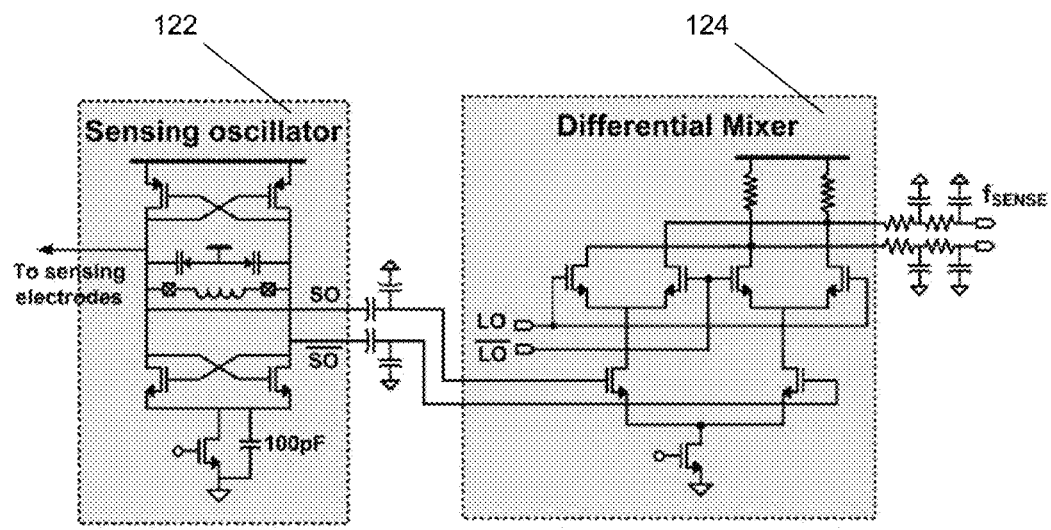
FIG. 3a is block diagram of sensing oscillator (SO) and a mixer.
Figure 3B:
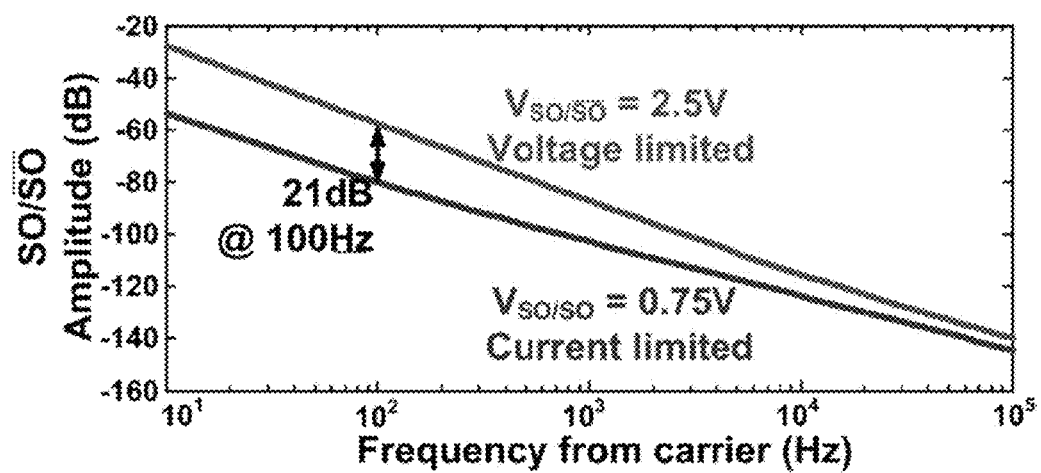
FIG. 3b is a graph showing SO voltage and current vs. frequency.

FIG. 3a is block diagram of sensing oscillator (SO) 122 and a mixer 124. It should be understood that a variety of SO structures may be sued without departing from the scope of this disclosure. It should also be understood that the LO may use the same structure or a different structure. FIG. 3b is a graph showing SO voltage and current vs. frequency. Oscillator phase noise is an important aspect and is set by device noise (1/f and white) as well as stray coupling from the display. Low phase noise is achieved thanks to substantial filtering of all these sources provided by the tank. This requires high tank quality factor (Q), primarily limited by the inductor. In this example, an 0805 inductor of 33 µH is used, giving Q=400 at 5 MHz. In addition to tank Q, biasing-current noise is also a critical factor. A 100 pF capacitor was added at the drain of the tail device, and also set the tail-current magnitude to ensure current-limiting, rather than voltage-limiting, conditions, giving a phase noise improvement of 21 dB (@100 Hz from $f_C$). Mixer linearity is also a critical factor for sensitivity. Since the SO and LO frequencies are offset, harmonics raise the possibility of in-band beat frequencies in the output at multiples of the ideal $f_{SENSE}$. To mitigate non-linearity, the SO may be provided via a capacitor divider, as shown, to reduce its swing to ~100 mV. The low-pass filter following the mixer has cut-off frequency of 50 kHz to filter high frequencies and mixer clock feed through.

Figure 4A:
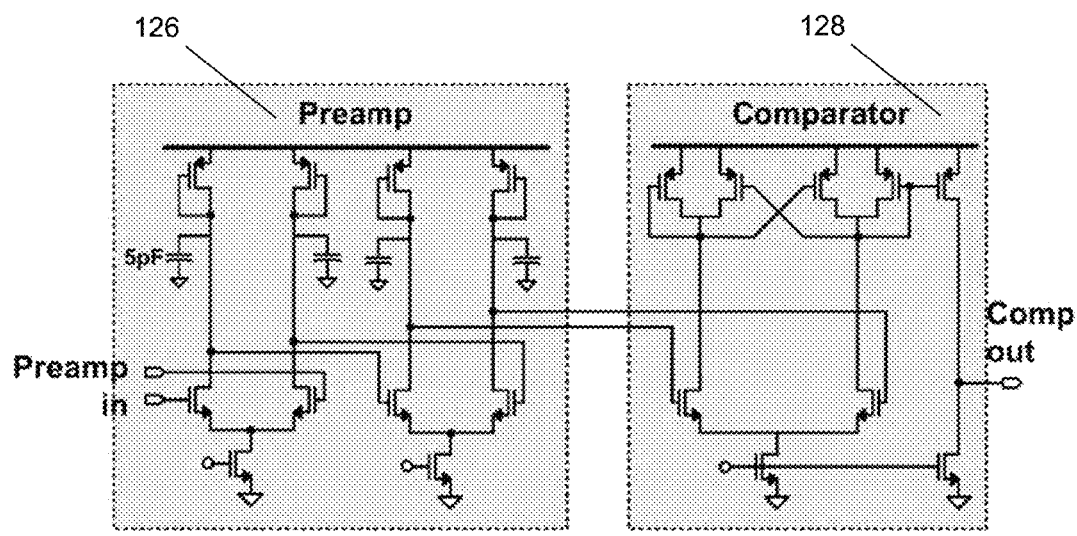
FIG. 4a is a block diagram of a preamp and comparator chain for generating digital TDC input from $f_{SENSE}$.
Figure 4B:
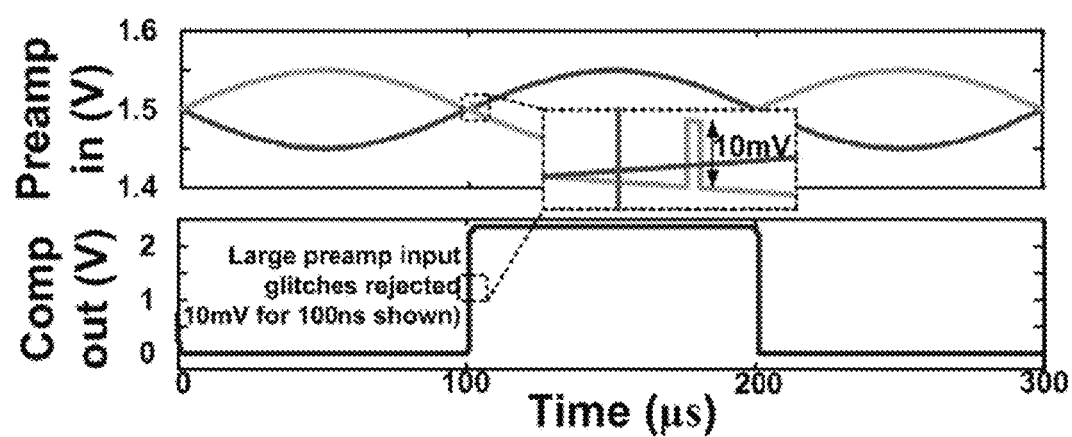
FIG. 4b is a graph showing the preamp input and comparator output vs. time.

FIG. 4a is a block diagram of a preamp 126 and comparator 128 chain for generating digital TDC input from $f_{SENSE}$. FIG. 4b is a graph showing the preamp input and comparator output vs. time. It should be understood that other preamp and comparator designs may be used without departing from the scope of this disclosure. With $f_{SENSE}$ modulated to a low frequency, amplitude noise with respect to a zero-crossing reference can substantially degrade sensitivity, causing noise in the TDC output. To mitigate amplitude noise, the 2-stage preamp, based on diode-connected PMOS loads, provides a gain of 6 per stage with noise filtering at a cutoff frequency of 200 kHz per stage, set by 5 pF capacitors at each output. The preamp feeds a hysteretic comparator. Hysteresis is adopted to ensure a digital output that is free of transient glitches, which is essential for the operation of the TDC period-control block and counter. The total input referred noise of the mixer, preamp and comparator stages is 1.4 $\mu V_{RMS}$, corresponding to a frequency readout noise of $\sigma_{f_c}$=16 $Hz_{RMS}$.

The system was prototyped, with the frequency-readout IC (FIG. 7) implemented in a CMOS 130 nm process from IBM and the sensing electrodes and OP patterned in-house using ITO-clad PET. The sensing electrodes are 1 cm wide and spaced with 10 cm pitch. For testing, we use four channels in each of the X and Y dimensions (8 channels total), giving a sensing area of 40×40 cm2. FIGS. 5a and 5b are graphs showing sensitivity measurements. FIG. 5a shows the readout SNR and TDC code (with RMS bars)

plotted versus distance for a finger positioned above a sensing electrode; as shown substantial SNR is maintained out to 30 cm (with 30 dB SNR at 16 cm). Though SNR is a widely used metric, in fact it is not representative of sensitivity in the presence of stray noise, such as from the display. FIG. 5b shows the TDC code (with RMS bars) when display noise, varied from zero to various peak-peak values, is driven directly onto the OP (by a capacitively-coupled amplifier whose input is fed from a display's common electrode); minimal impact on readout is observed even with large noise values. FIG. 6 is a table showing a measurement summary and a comparison with the state of the art. While other systems are touch based, the presented system achieves the highest reported SNR for distances to 30 cm. The worst-case resolution for lateral-displacement sensing is shown for various distances above the electrode (resolution is defined as the displacement at which the difference in mean TDC code equals the code RMS). The digital circuits and OP driver are powered from 1.2V while the analog circuits are powered from 2.5V, giving total power consumption less than 20 mW (475 µW for frequency readout, 19 mW for OP driver). The readout time is 500 µs per channel, enabling a 240 Hz scan rate.

It should be understood that several variations are possible based on the disclosed touch sensing approach. As explained above, traditional capacitance-based touch sensing has been limited to distances of 1-2 cm. The disclosure herein achieves extended range (>30 cm) for row and column electrodes. An underlying oscillating plane is used to mitigate electric field fringing caused due to the display's ground plane beneath. In some cases, row and column electrodes can suffer from ghost effects when sensing multiple gestures simultaneously (as in multi-touch displays). This is can be limiting for large-area interactive-spaces applications, targeting collaborative interactions across multiple users via sensing interfaces embedded within every-day objects (table surfaces, wallpaper, furniture).

To overcome ghost effects, this work presents an extended-range capacitance-sensing system using an array of pixel electrodes. Extended-range sensing requires high-sensitivity readout, posing several challenges for pixel-based sensing:

1) As the size of the array scales, the number of signals that must be interfaced to the CMOS readout IC increases; active-matrix approaches based on thin-film transistor (TFT) circuits can be considered, but these increase noise (due to TFT switching), degrade sensitivity (due to TFT on resistance), and limit the frame rate (due to TFT speed).

2) As the size of the array scales, higher readout rates are necessary due an increased number of electrodes per frame; and 3) The routing required to each pixel in the array raises parasitic capacitive coupling to gestures, degrading the localization of capacitance sensing at the pixels.

To overcome these challenges, a system can be implemented with embedded amorphous-silicon (a-Si) TFT circuits that are patterned on flex for each touch sensor (pixel). It should be understood that the disclosed pixel-based touch sensors may be integrated into a display having a common electrode and/or and oscillating plane or other touch surfaces without a common electrode or oscillating plane. The circuits perform capacitance-to-frequency conversion and control of pixel readout, greatly improving the interfacing and readout rate achievable with a CMOS readout IC. It should be understood that the disclosed techniques may be applied to a variety of integrated circuit technologies without departing from the scope of this disclosure.

Figure 8:
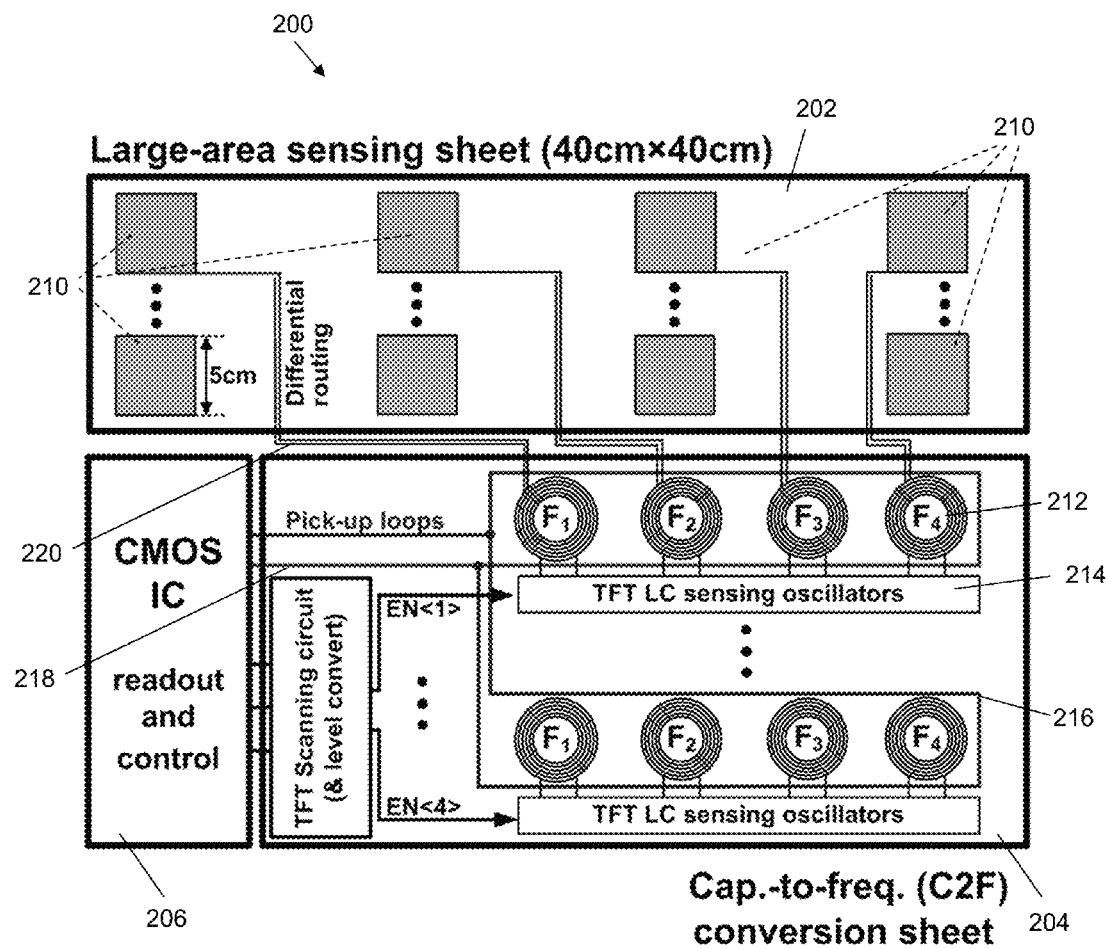
FIG. 8 is a block diagram showing a system architecture including a flexible pixel-based large-area sensing sheet, a flexible capacitance-to-frequency (C2F) conversion sheet and a custom CMOS readout IC.

FIG. 8 is a block diagram showing a system architecture 200, including a flexible pixel-based large-area sensing sheet 202, a flexible capacitance-to-frequency (C2F) conversion sheet 204 and a custom CMOS readout IC 206. The large-area sensing sheet 202 includes a two-dimensional array of touch sensors or pixels, e.g., a 4×4 array of electrode pixels 210, each 5×5 $cm^2$. Touch sensor electrodes can be implemented using both ITO and copper although other materials may be used. It should be understood that wide variety of pixel configurations are possible without departing from the scope of this disclosure. Extended-range sensing not only enables 3D gestures, but also substantially benefits power consumption by allowing a pixel separation pitch of 10 cm. A large sensing area (40×40 $cm^2$ in this system) can thus be achieved with relatively few pixels.

For self-capacitance readout, the pixels connect to the C2F conversion sheet 204. In this example, the C2F conversion sheet 204 includes of an array of TFT LC sensing oscillator (SO) 214, one for each pixel. Gestures perturb the self-capacitance of pixels, resulting in a frequency shift in the SOs. Frequency-division multiplexing may be used to increase readout frame rate. In this example, the SOs corresponding to the four pixels in each row are set to four different nominal frequencies ($F_{1-4}$). This enables simultaneous readout of each row in four different frequency channels. Each row of SOs is surrounded by a pick-up loop 216, and the loops from the four rows are connected in parallel to a single pickup loop 218 interfaced to the CMOS readout IC 206. During readout, TFT scanning circuits, under the control of the CMOS readout IC 206, sequentially enable each row of SOs via the round-robin EN<1-4> signals. Scalability in the number of pixels, and thus the overall sensing area, is enabled by the use of a single interface to the CMOS readout IC, and increased frame rate is enabled by simultaneous readout of the four pixels in each row.

To further enable extended-range sensing with two-dimensional arrays pixels, two approaches may be used. First, high-Q TFT SOs may be used, enabled by large patterned inductor. This enhances sensitivity by filtering both stray noise and TFT device noise. The SOs and low-noise CMOS readout channel are described below. Second, on the large-area sensing sheet, differential routing may be used for the traces that connect the SOs to the pixels as shown generally by reference number 220. Although only a single trace is required for each connection, electrostatic coupling from gestures to anywhere on the trace can affect the capacitance that is sensed, thus degrading sensing localization at the pixels. To ensure sensing localized at the pixels, a counter-phase signal is routed close to each trace (as shown in FIG. 8). This causes strong electrostatic coupling to the trace, confining its electric field, thus making the pixel self-capacitance the dominant coupling to gestures. The counter-phase signal is readily available from the TFT SOs.

Figure 9:
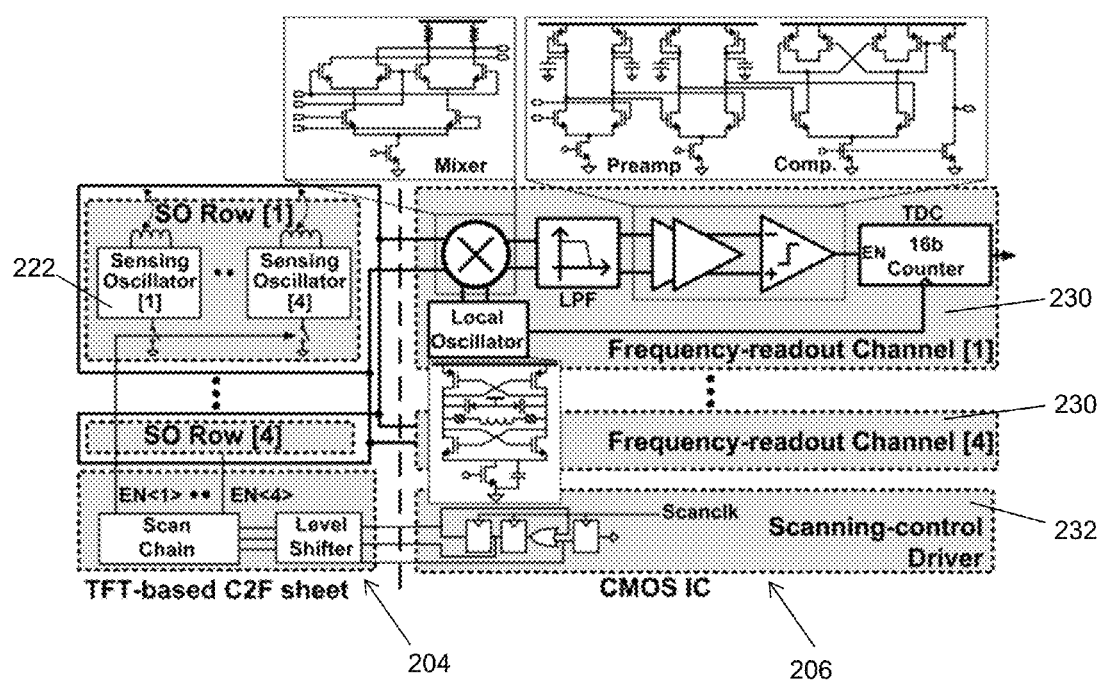
FIG. 9 is a block diagram showing additional details of the C2F sheet and CMOS readout IC.

Additional details of the C2F sheet and CMOS readout IC are shown in FIG. 9. In this example, the four SOs 222 in each row are designed to have nominal frequencies separated by a minimum of 400 kHz (set by the patterned planar inductors). The four SOs 222 inductively couple with the pick-up loop. The CMOS readout IC includes four frequency-readout channels 230 and a scanning-control driver 232.

The four CMOS frequency-readout channels are similar to those disclosed in: Y. Hu, L. Huang, W. Rieutort-Louis, J. Sanz-Robinson, S. Wagner, J. C. Sturm and N. Verma, "*3D gesture-sensing system for interactive displays based on extended-range capacitive sensing*," ISSCC Dige. Tech.

papers, pp 212-213, February 2014 which is incorporated herein in its entirety. Each channel includes an LC local oscillator (set for each of the nominal SO frequencies). Frequency down conversion is performed via a differential Gilbert mixer, and frequency-channel isolation is achieved on the down-converted signal by a second-order low-pass filter (LPF). The LPF cutoff frequency is set at 20 kHz, which results a minimum amplitude suppression of 26 dB from adjacent channels. The resulting output is amplified into a frequency-modulated digital signal using a two-stage preamplifier and a continuous-time hysteretic comparator. To reduce noise, two approaches are adopted: (1) the preamps filter out noise with a cutoff frequency of 200 kHz, set by the 5 pF output capacitors; (2) hysteresis in the comparator prevents erroneous output edges that can occur due to noise near the crossing point of the down-converted signal. Digitization of the frequency is then performed using a 16-b time-to-digital converter (TDC) with clock derived from LO.

The scanning-control driver simply generates a global reset and two-phase clock signals with 3.6V swing to control generation of the round-robin EN<i> signals by the TFT circuits on the C2F sheet. The following describe details of the TFT circuits, which help enable enhanced scan rate and scalability for the pixel array.

A. Thin-Film Sensing Oscillators (SOs)

Figure 10:
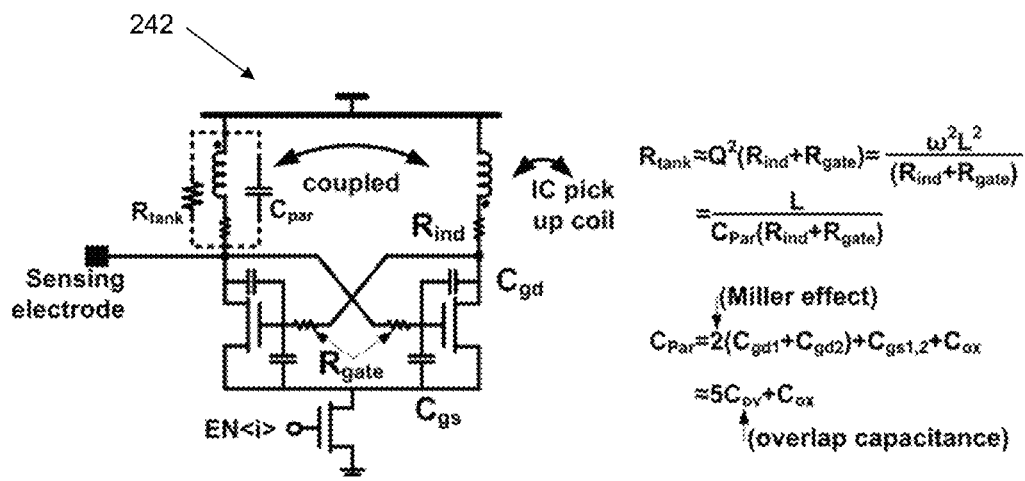
FIG. 10 is a block diagram of a sensing oscillator (SO)
Figures 11A, 11B:
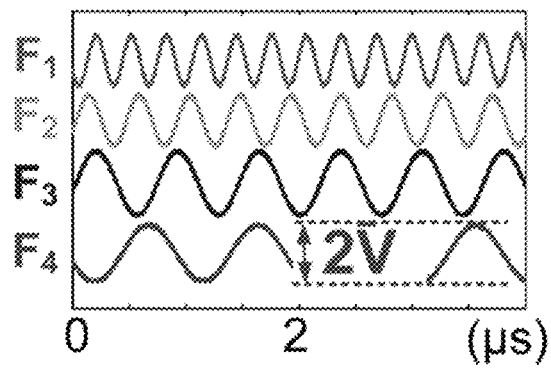
FIG. 11a is a table and FIG. 11b is a graph showing the inductor parameters for the four nominal SO frequencies (3.0 MHz, 2.4 MHz, 1.7 MHz, 1.3 MHz)

FIG. 10 is a block diagram of a sensing oscillator (SO) 242. It should be understood that other SO configurations may be used without departing from the scope of this disclosure. High-frequency oscillations are required to adequately separate the four frequency-readout channels, and low phase noise (jitter) is required to ensure adequate capacitance-sensing accuracy within the channels. Although the TFTs have low performance, with $f_T$ around 1 MHz, high-frequency oscillations beyond the $f_T$ are achieved using an LC oscillator. This is possible because the tank inductor resonates with the TFT parasitic capacitances, thus enabling frequencies not limited by the parastics. An important requirement is that a positive-feedback oscillation condition be met ($g_m R_{tank} > 1$). The ability to pattern physically-large spirals enables increased inductor Q (high $R_{tank}$), enabling robust oscillations despite the low TFT performance. FIG. 11a is a table and FIG. 11b is a graph showing the inductor parameters for the four nominal SO frequencies (3.0 MHz, 2.4 MHz, 1.7 MHz, 1.3 MHz). Oscilloscope waveforms of four parallel SO channels $F_{1-4}$ are also plotted. The resulting high-Q tanks also improve oscillator jitter against high TFT noise. This is an important factor since it poses a limitation on system SNR. The measured jitter is <5.4 psRMS for all the oscillators.

B. Thin-Film Scanning Circuit

The TFT scanning circuit is configured to generate sequential row-enable signals (EN<i>) scalable to a large number of rows, yet using a minimal number of signals from the CMOS readout IC. The EN<i> signals drive the tail TFT of the SOs (see FIG. 10). A challenge for the scanning circuit is that, on the one hand, a large and rapid output voltage swing is required both for adequate current (transconductance) in the SO devices (to meet the positive-feedback oscillation condition) and for high scan rate; on the other hand, the absence of PMOS devices in a standard a-Si process can lead to large static currents, elevating power consumption, particularly when using large supply voltages and devices for the required swing and speed.

Figure 12:
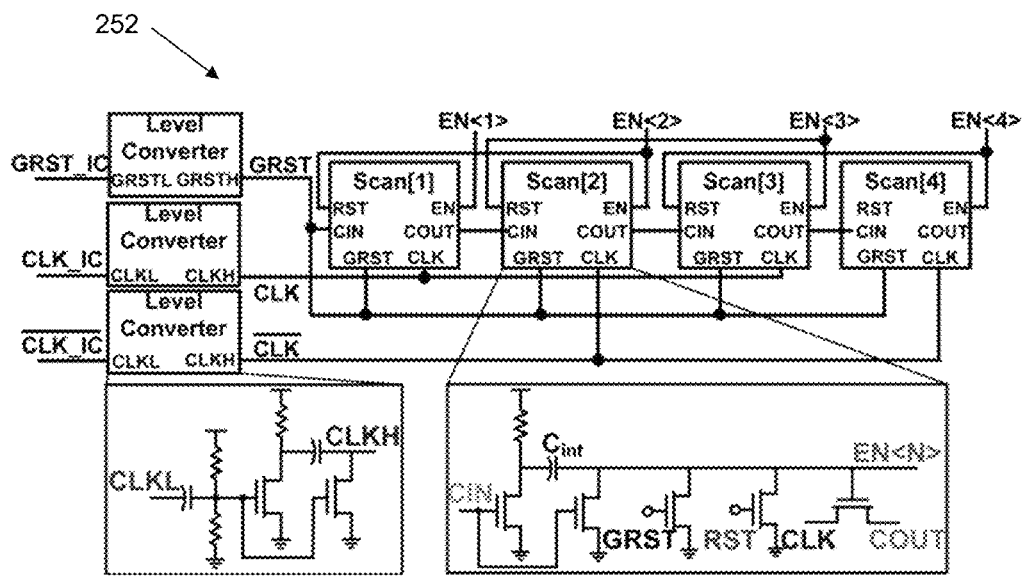
FIG. 12 is a block diagram of a scanning circuit.

FIG. 12 is a block diagram of a scanning circuit 252. The circuitry used is similar to a design disclosed in: T. Moy, W. Rieutort-Louis, Y. Hu, L. Huang, J. Sanz-Robinson, J. C. Sturm, S. Wagner and N. Verma, "Thin-Film Circuits for Scalable Interfacing Between Large-Area Electronics and CMOS ICs," Device Research Conference, June, 2014 which is incorporated herein in its entirety. It should be understood that other scanning circuits may be used without departing from the scope of this disclosure. The scanning circuit requires only three control signals from the CMOS readout IC: two-phase clock signals (CLK_IC, $\overline{CLK\_IC}$) and a global reset (GRST_IC). Aside from the level converters (which convert the CMOS 3.6V IO voltages to ~15V), static power consumption is consumed by only one scan element (Scan[i]) at a time. This enables scalability in the number of rows with minimal scaling in total power consumption. Despite the absence of PMOS devices, EN<i> outputs with full swing close to the TFT supply voltage are generated.

Figures 13A, 13B:
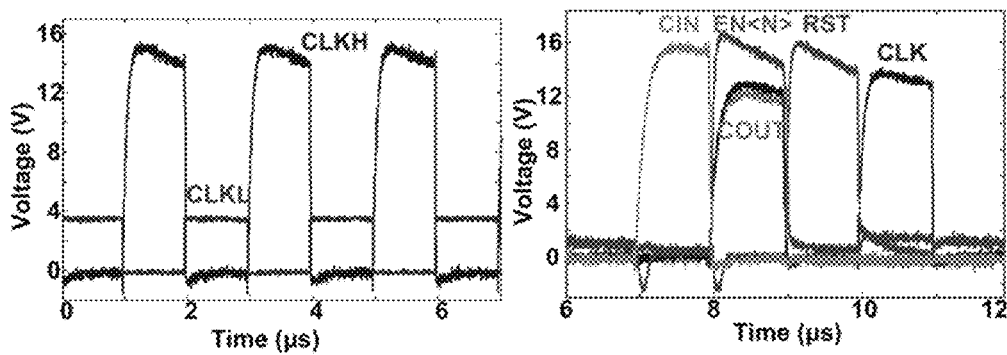
FIGS. 13a and 13b are graphs showing measured operational waveforms for both a level converter and the NTH scan element in the chain.

FIGS. 13a and 13b are graphs showing measured operational waveforms for both a level converter and the $N^{TH}$ scan element in the chain. The level converter is a common-source amplifier biased for adequate gain through an input AC-coupling network (see FIG. 12). The AC-coupling time constant is set slow enough to preserve the clock pulses. A low-value load resistor, chosen for fast rise time, prevents the output of the common-source amplifier from fully reaching ground. To achieve a swing to ground, an output capacitor and NMOS are included, thus ensuring maximal gating of static currents in the scan elements.

The scan element (see FIG. 12) works generally as follows. Initially, only the EN<N> node is discharged to ground through the global-reset signal (GRST). Then, during scanning, the $N^{TH}$ element receives a charge-in signal (CIN) from the N-1 element, driven by CLK/$\overline{CLK}$. This discharges both plates of the internal capacitor $C_{int}$. Subsequently, when CIN goes low, the pull-up resistor charges the bottom plate of $C_{int}$ high. $C_{int}$ (470 pF) is set to be larger than the parasitic capacitors loading the output, thus causing EN<N> to also rise to a value close to the supply voltage. This then enables COUT to go high when controlled by CLK/$\overline{CLK}$. Following this, only the top-plate of $C_{int}$ is discharged through the reset signal (RST) received from N+1 element. Subsequently, leakage currents due to TFTs on the top plate of $C_{int}$ act to hold the output voltage in this state. This allows the number of scan elements to be robustly increased despite longer time between active reset of the dynamic output node. Additionally, since CIN is asserted for only one scan element at a time, the active and static power does not scale with the number of elements in the chain.

Experimental Results

Figure 14:
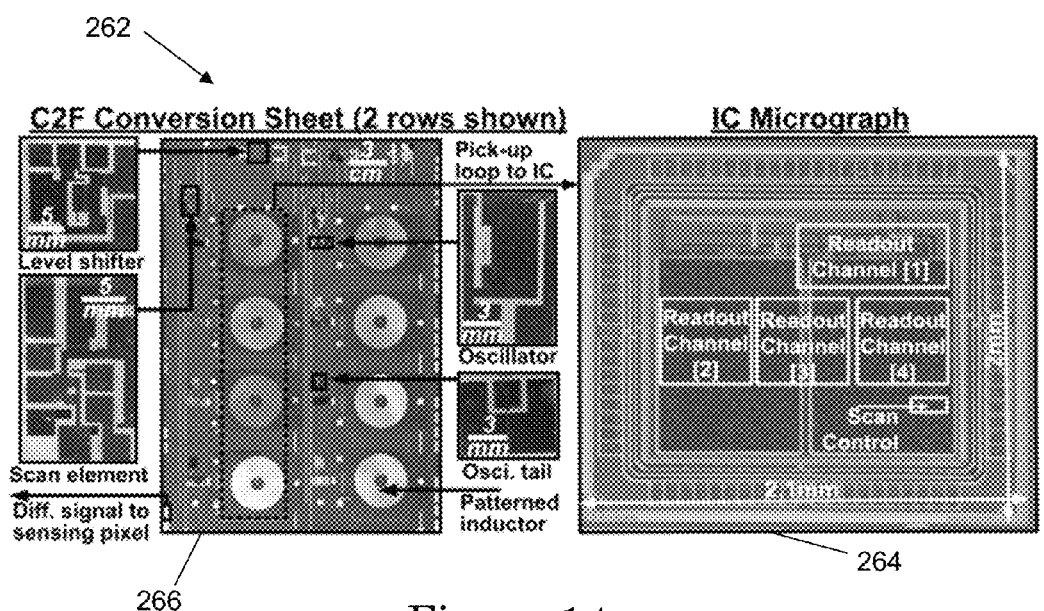
FIG. 14 is a diagram of a prototype touch sensing system.

FIG. 14 is a diagram of a prototype touch sensing system 262. The touch sensing system 252 includes a custom CMOS readout IC 264 fabricated in 130 nm CMOS from IBM and TFT circuits 266 fabricated in house on 50 µm polyimide (only half of the C2F sheet is shown for clarity). TFT processing is based on hydrogenated a-Si (a-Si:H), at a temperature of 180° C. The cross-coupled TFTs of the SOs are sized 3600 µm/6 µm for the low-frequency channels ($F_3$ and $F_4$) and 1800 µm/6 µm for the high-frequency channels ($F_1$ and $F_2$). The TFTs of the scan circuits are sized 2000 µm/10 µm (CIN TFTs) and 1000 µm/10 µm (GRST, RST and CLK TFTs). The TFTs of the level shifters are sized 7200 µm/10 µm for the common-source amplifier and 3000 µm/10 µm for output pull-down device.

Figures 15A, 15B:
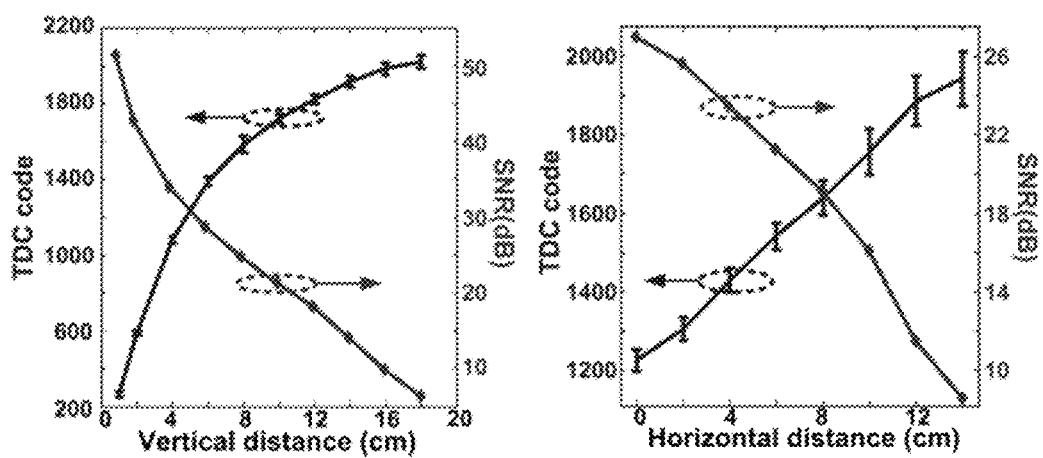
FIG. 15a is a graph showing the readout SNR and TDC code (with RMS bars) plotted vs. distance for a hand positioned above a sensing electrode.
FIG. 15b is a graph showing the readout SNR and TDC code vs. horizontal displacement for a hand 5 cm above a sensing electrode.

FIGS. 15a and 15b are graphs showing sensitivity measurements using copper electrodes. FIG. 15a shows the readout SNR and TDC code (with RMS bars) are plotted versus distance for a hand positioned above a sensing electrode; as shown substantial SNR is maintained out to 16 cm (with 22 dB SNR at 10 cm). FIG. 15b shows the SNR and TDC code are shown versus horizontal displacement for a hand 5 cm above a sensing electrode; 22 dB SNR is achieved for a displacement of 5 cm (corresponding to the worst-case displacement for the 10 cm electrode pitch used).

FIGS. 16a and 16b are graphs showing the measured waveforms and readout outputs in the time domain. FIG. 16a shows the round-robin EN<1-4> signals generated by the TFT scan circuits. FIG. 16b shows the frequency shift obtained from the CMOS IC while swiping a hand across a row of electrodes at a distance 6 cm above (the frequency change Δf shown is derived from the obtained TDC code).

FIG. 17 is a table showing a performance summary of the prototype touch sensing system. The system achieves an SNR of 22B with a hand at 10 cm distance. At the distance of 10 cm, the x,y-direction resolution is 1.8 cm, and the z-direction resolution is 1 cm. The 4-channel CMOS readout circuit consumes 1.8 mW. The TFT SO array and scanning circuits consume 24 mW from a 20V supply. With the scanning circuit running at 1 kHz, the readout time is 1 ms per row, enabling a 240 Hz scan rate.

3D gesture sensing enables compelling human-computer interfaces. Systems scalable to large-area sheets and based on flexible form factor are of particular interest due their potential to be integrated within objects and surfaces in typical living spaces. Capacitive-sensing systems have recently demonstrated the ability to achieve extended range, making them viable for 3D gesture sensing. Disclosed herein are structures configured to reduce or eliminate fringing and also provide for a pixel-based touch sensing system. Prior system had limited ability to detect and isolate multiple gestures simultaneously without ghost affects. The disclosed structures extended-range capacitive sensing (>16 cm) with reduced fringing and may also include a scalable array of pixels. Prior pixel based sensing posed a challenge due the need for an increased number of interfaces to the readout IC. The disclosed system overcomes this by employing TFT sensing oscillators (SOs) for pixel capacitance-to-frequency conversion and TFT scanning circuits for sequentially enabling rows of pixel SOs. All pixels are thus interfaced to the readout IC through a single interface, via inductive coupling. All TFT circuits were fabricated in-house on flex and the IC is fabricated using a 130 nm CMOS process from IBM. Using a 4×4 array of pixels, spanning a sensing area of 40 cm×40 cm, the system achieves a scan rate beyond 240 frames per second at a power consumption of 1.8 mW for the IC and 24 mW for the TFT circuits.

Figure 18:
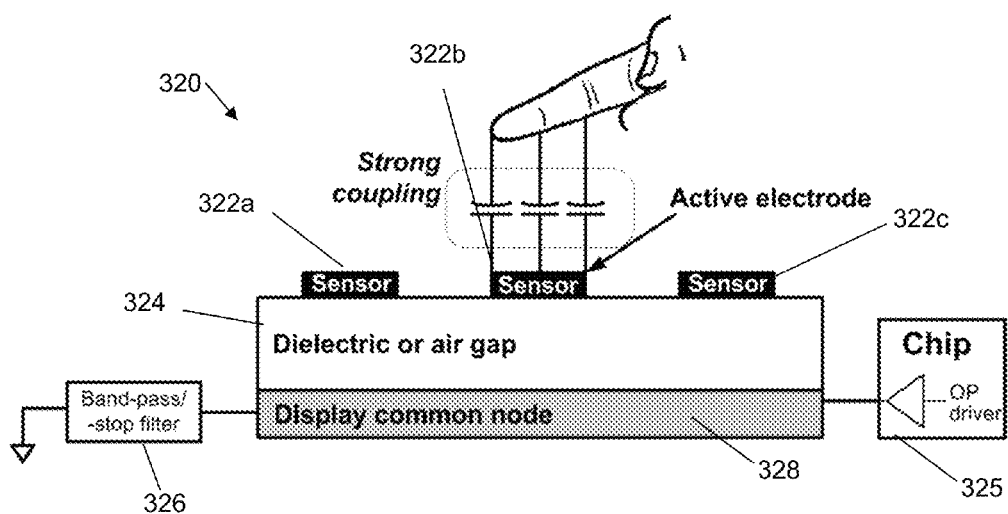
FIG. 18 is a bock diagram of display of touch sensing electrodes and a combined common ground plane and oscillating plane.

FIG. 18 is a bock diagram showing an alternate configuration of the oscillating plane. In this example, the display common node functions basically as a ground plane as well as an oscillating plane. In a typical display the display common electrode is often at the same voltage as the display chassis ground. It should be understood that the specific voltage at the display common electrode may be varied without departing from the scope of this disclosure. It also should be understood that this configuration is suitable for use with the circuitry disclosed in the embodiments above.

As shown in FIG. 18, a display 320 includes touch sensing electrodes 332a-332c. The display 320 includes a dielectric or air gap 324 and a combined common-electrode and oscillating (display common node) 328. The display common node may be tied to ground via a bandpass or stop filter as shown by block 326. The display common node 328 functions as an oscillating plane and is driven by a driver as shown by block 325. The output impedance of the OP driver may be optimized to increase sensing range. The output impedance of the OP driver may be resistive or reactive. The OP driver is nominally a unity gain buffer, but its transfer function can be optimized, both in magnitude and phase, to optimally drive the OP and display common electrode. For example, a slight attenuation of the OP voltage may be helpful in certain circumstances.

Again in this example, the touch sensing electrodes 322a-322c may be formed of ITO. It should again be understood other materials may be used without departing from the scope of this disclosure. As discussed in connection with FIG. 1a, it should also be understood that any number of touch sensing electrodes may be provided and the touch sensing electrodes may be formed in a variety of shapes. In this example, the touch sensing electrodes 332a-332c are isolated from the plane of the combined common-electrode/oscillating plane 338. In general, the coupling between the touch sensing electrodes 32a-32c and the combined common-electrode/oscillating plane 338 mitigates electric field fringing to the display's ground plane beneath.

Figure 19:
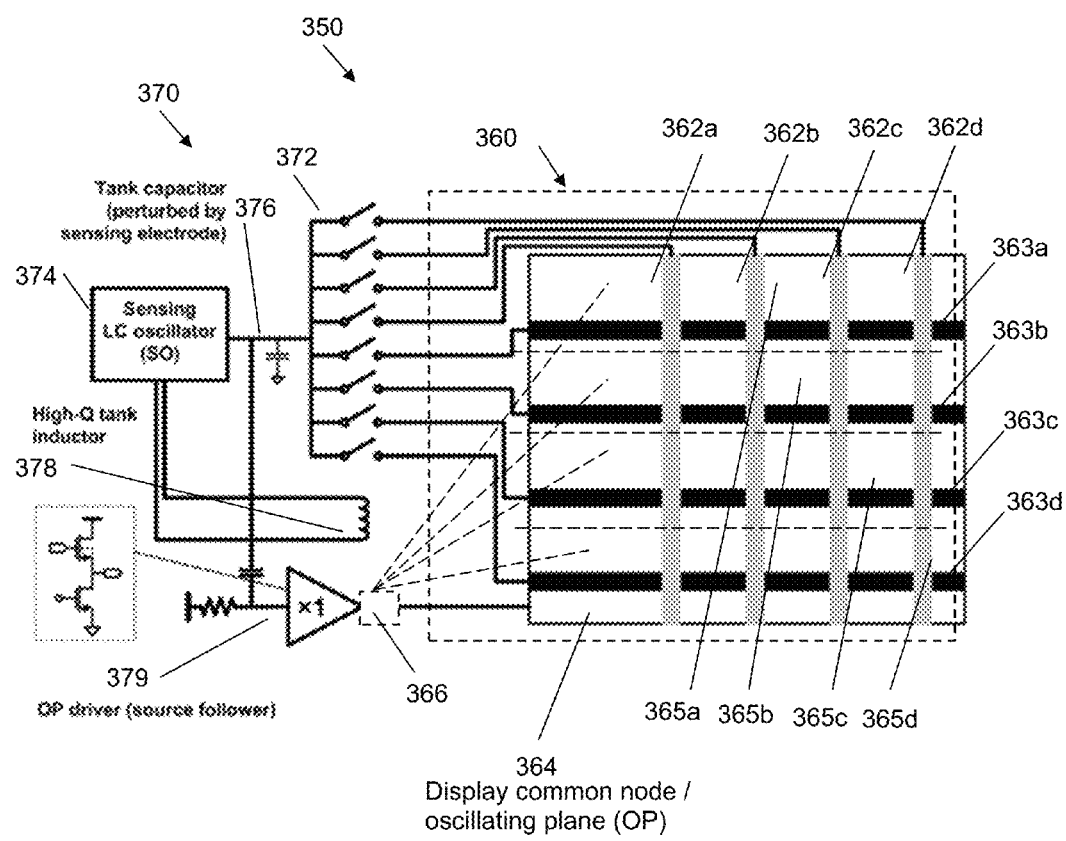
FIG. 19 is a block diagram of a touch sensing system that can be integrated with a display or other touch surface including a combined common ground plane and oscillating plane.

FIG. 19 is a block diagram of a touch sensing system 350 that can be integrated with a display or other touch surface 360 shown generally in dashed lines. As shown, touch sensing electrodes 362a-362d, 363a-363d are formed on the touch surface as bars in a row/column format and are connected one-by-one to a detector shown generally by reference number 370. It should be understood that a variety of detectors may be used without departing from the scope of this disclosure. In general the detector 370 determines a frequency shift based on a change in capacitance at one of more touch sensing electrode. In absence of a touch from a user, each touch sensitive electrode has a baseline self-capacitance. As a user, e.g., a user's finger, approaches the touch surface, one or more touch sensitive electrodes begins to couple to the finger and there is a change in the baseline capacitance of the electrode to a touch capacitance. The resulting change in capacitance/frequency shift can then be correlated to a distance Z. The configuration of the electrodes may then be used to identify an X-Y location or area on the touch surface to provide 3D touch detection.

In this example, the detector 370 includes an LC sensing oscillator (SO) 374 that is coupled to the touch sensitive electrodes 362a-362d, 363a-363d via switch 372. The SO generally includes a tank capacitance 376 and tank inductor 378. Depending on the proximity of a user, the self-capacitance of each touch sensitive electrode perturbs the tank capacitance 376, causing a frequency shift. Meanwhile, the display common node (OP) 364 is driven to the same voltage as the SO 374 (and hence the connected electrode) by a unity-gain buffer 379 implemented by a source follower. Consequently, electric field due to oscillatory charge redistribution on the electrode does not interact with the OP, resulting in much stronger coupling to a user even at great distances. In addition to sensing distance, this enables several benefits. First, since coupling between the electrodes and the OP is not a factor, their separation distance can be aggressively reduced (<1 mm is used in this work). Second, separation between the OP and the display common electrode can also be reduced at the cost of increased OP capacitance and thus higher power in the unity-gain buffer; however, the OP driver consumes less than 19 mW in this example with a separation of 1 mm, making its overhead acceptable. A benefit of frequency-modulated readout is also that minimal noise is imposed on the display since the amplitude is not critical for increasing distance and is thus fixed at a value (0.75V). Third, extended sensing distance enables electrodes to provide later-displacement information (characterized below), allowing fewer electrode channels for covering large display areas, thus reducing power consumption and scan-rate constraints.

In some cases, the use of multiple figures can create difficulty in resolving an accurate touch position. It should be understood that the OP 364 may be implemented as a single plane or may subdivided. For example, FIG. 19 is similar to FIG. 1c and shows an optional configuration where the OP 364 is divided into a plurality of segments, e.g., four column-wise segments 365a-365d as shown my dashed lines. Each OP segment 365a-365d may be coupled to a switch shown generally by reference number 366 and energized individually during touch sensing. This allows for more accurate identification of the touch location particularly when using a row/column configuration for touch sensors.

Further description of the disclosed device is papers: Y. Hu, L. Huang, W. Rieutort-Louis, J. Sanz Robinson, S. Wagner, J. C. Sturm, and N. Verma, "*3D Gesture Sensing System for Interactive Displays Based on Extended-range Capacitive Sensing*," Int'l Solid-State Circuits Conf. (ISSCC), February 2014; Yingzhe Hu, Tiffany Moy, Liechao Huang, Warren Rieutort-Louis, Josue Sanz Robinson, Sigurd Wagner, James C. Sturm, Naveen Verma, "*3D Multi-Gesture Sensing System for Large Areas based on Pixel Self-Capacitance Readout using TFT Scanning and Frequency-Conversion Circuits*." These references are also part of the application and are incorporated by reference in their entirety as if fully set forth herein.

Any and all references listed herein are also part of the application and are incorporated by reference in their entirety as if fully set forth herein. It should be understood that many variations are possible based on the disclosure herein. Although features and elements are described above in particular combinations, each feature or element can be used alone without the other features and elements or in various combinations with or without other features and elements. The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs)

What is claimed is:

1. A three dimensional touch sensing system having a touch surface configured to detect a touch input located above the touch surface, the system comprising:
    a plurality of capacitive touch sensing electrodes disposed on the touch surface, each electrode having a baseline capacitance and a touch capacitance based on the touch input;
    an oscillating plane disposed below the touch surface;
    a touch detector configured to drive one of the touch sensing electrodes with an AC signal having a frequency that shifts from a baseline frequency to a touch frequency based on the change in electrode capacitance from the baseline capacitance to the touch capacitance, the touch detector being configured to drive the oscillating plane to the touch frequency.

2. The system of claim 1 wherein the touch surface is a display having a common electrode located below the oscillating plane.

3. The system of claim 1 wherein the touch surface is a display having a combined common node and oscillating plane.

4. The system of claim 1 wherein the plurality of capacitive touch sensing electrodes includes a plurality of row electrodes and a plurality of column electrodes.

5. The system of claim 1 wherein the plurality of capacitive touch sensing electrodes are configured in a two-dimensional array.

6. The system of claim 1 wherein the oscillating plane is configured as a rectangular area.

7. The system of claim 1 wherein the oscillating plane is configured with a plurality of independently drivable segments.

8. The system of claim 1 wherein the touch detector is configured to determine a distance Z from the touch surface to the touch input based on the change in electrode capacitance from the baseline capacitance to the touch capacitance.

9. The system of claim 1 wherein the plurality of capacitive touch sensing electrodes have an X-Y geometric relationship with respect to the touch surface and the touch detector is configured to determine an X-Y location of the touch input based on the X-Y geometric configuration of the plurality of capacitive touch sensing electrodes with respect to the touch surface.

10. The system of claim 1 wherein the system further comprises a frequency-readout integrated circuit (IC), the touch surface being configured with capacitance-to-frequency conversion circuitry and the frequency-readout IC being configured with frequency to digital conversion circuitry.

11. The system of claim 10 further comprising an inductive loop coupled to the capacitance-to-frequency conversion circuitry, the frequency-readout IC being inductively coupled to the inductive loop.

12. A three dimensional touch sensing method for use with a touch surface configured to detect a touch input located above the touch surface, the method comprising:
    providing a plurality of capacitive touch sensing electrodes disposed on the touch surface, each electrode having a baseline capacitance and a touch capacitance based on the touch input;
    providing an oscillating plane disposed below the touch surface;
    driving one of the touch sensing electrodes with an AC signal having a frequency that shifts from a baseline frequency to a touch frequency based on the change in electrode capacitance from the baseline capacitance to the touch capacitance and driving the oscillating plane to the touch frequency.

13. The method of claim 12 wherein the touch surface is a display having a common electrode located below the oscillating plane.

14. The method of claim 12 wherein the touch surface is a display having a combined common node and oscillating plane.

15. The method of claim 12 wherein the plurality of capacitive touch sensing electrodes includes a plurality of row electrodes and a plurality of column electrodes.

16. The method of claim 12 wherein the plurality of capacitive touch sensing electrodes are configured in a two-dimensional array.

17. The method of claim 12 wherein the oscillating plane is configured as a rectangular area.

18. The method of claim 12 wherein the oscillating plane is configured with a plurality of independently drivable segments.

19. The method of claim 12 further comprising determining a distance Z from the touch surface to the touch input based on the change in electrode capacitance from the baseline capacitance to the touch capacitance.

20. The method of claim 12 wherein the plurality of capacitive touch sensing electrodes have an X-Y geometric relationship with respect to the touch surface and determining an X-Y location of the touch input based on the X-Y geometric configuration of the plurality of capacitive touch sensing electrodes with respect to the touch surface.

21. The method of claim 12 further comprising providing a frequency-readout integrated circuit (IC), the touch surface being configured with capacitance-to-frequency conversion circuitry and the frequency-readout IC being configured with frequency to digital conversion circuitry.

22. The method of claim 21 further comprising providing an inductive loop coupled to the capacitance-to-frequency conversion circuitry, the frequency-readout IC being inductively coupled to the inductive loop.

23. A three dimensional touch detector for use with a touch surface with a plurality of capacitive touch sensing electrodes configured to detect a touch input located above the touch surface, each electrode having a baseline capacitance and a touch capacitance based on the touch input, the touch detector comprising:

an electrode driver configured to drive one of the touch sensing electrodes with an AC signal having a frequency that shifts from a baseline frequency to a touch frequency based on the change in electrode capacitance from the baseline capacitance to the touch capacitance; and an oscillating plane driver configured to drive an oscillating plane to the touch frequency.

24. The detector of claim 23 further comprising a frequency-readout integrated circuit (IC), the touch surface being configured with capacitance-to-frequency conversion circuitry and the frequency-readout IC being configured with frequency to digital conversion circuitry.

25. The detector of claim 23, wherein an inductive loop is coupled to the capacitance-to-frequency conversion circuitry, the frequency-readout IC being inductively coupled to the inductive loop.

* * * * *